Patented Apr. 15, 1947

2,418,914

UNITED STATES PATENT OFFICE 2,418,914

TENDERING MEAT

Vladimir Leslie Tichy, Cleveland, Ohio

No Drawing. Application August 1, 1944,
Serial No. 547,623

8 Claims. (Cl. 99—107)

This invention relates to the treatment of meat, and more particularly to a process for making meat more tender and thus more easily masticated, as well as relating to the product of said process.

The principal object of my invention is to rapidly create a change in meat which will result in its being more easily masticated and more tender in a short time after slaughtering of the animal.

Another object of my invention is the treatment of meat in such a way that the normal ripening process is aided by physical and/or chemical means so that the flavor and taste of the product will not be impaired, and may actually be better because of the shorter time required.

A further object of my invention is to introduce into the meat small quantities of softening or tenderizing agents in such a manner that the product shall retain desirable appearance and flavor, and at the same time be made less tough.

A further object of my invention is to treat meat which is considered tough in such a way that the toughness shall be diminished and the product be made thus more valuable.

A further object is to speed up the treatment of meat so as to avoid changes in appearance, taste or odor that follow when the process is prolonged.

An additional object is to provide a method whereby desirable materials such as fats, vitamins, moisture, enzymes, or even desirable mineral constituents may be added to the meat without impairing undesirably its appearance, taste or edibility.

A still further object is to introduce into the product, if desired, substances which will actually better its flavor.

Other objects and advantages of my invention will appear from the following description.

It is well known that pure "involuntary" muscle tissue or heart muscle tissue is in young form tender, easily masticated and easily lends itself to the process of cooking without becoming undesirably tough. Also, an increase in the fat content of such meat enhances the property of tenderness. Toughness of meat, as generally considered, is chiefly due to fibrous material present between muscle fibers and between groups of muscle fibers, and to tough substances such as blood vessels and nerves. However, the muscular elements themselves may, due to the reduction in water and fat content and other changes that ensue with age or relatively poor nourishment of the animal, become less friable, and thus less tender than in the most desirable state.

In the ordinary ripening of meat, whether simply by hanging or when using increased temperatures in conjunction with previously used processes, a tenderizing effect is produced by naturally ensuing chemical processes, the object of which is the changing of the fibrous portion of the meat, or connective tissue, so that it becomes more friable and thus the entire product is made less tough. In the living state, muscle tissues are neutral or alkaline in the rested animal, as measured by the pH value. In a few hours, changes occur which result in a distinctly acid product, the pH reaching much lower values. Another method that has been in use is pickling, wherein generally salts, acids or other substances cause changes in the fibrous tissue. Heating or smoking of meat also accomplishes changes. During the usual ripening or hanging of meat, there must be a time limitation because when the process is prolonged changes of undesirable character take place with resulting change in taste and/or edibility. Pickling and smoking methods so alter the product that, while desirable for certain types or qualities of product, they are undesirable for general use.

According to my invention, the introduction of fatty substances or even a small amount of moisture into or immediately adjacent to the fibrous element of the meat can alter the degree of tenderness favorably during the usual cooking as then the fibers are spread apart by the fatty substances or moisture, and the meat becomes more pleasant to eat. Meat which has been impregnated deeply with such desirable substances which may be animal fats, including butter, or vegetable fats or even water, will result in a more desirable cooked product. Furthermore the deposition of some such particles within the muscle fibers (as distinct from the connective tissue), increases the desirability of the cooked product especially in the case of the more touch meats such as are obtained from older or leaner animals or fowls.

It may be here stated that the term cooking as used in this application refers to any specific method of final finishing such as broiling, frying, boiling, smoking, roasting and steaming, or other method of preparation of meat with the aid of heat. The term meat includes the well known product of animals including fowls, and the larger fish.

The mechanical disruption of some of the fibrous portion of the meat, even if of slight degree, will enable chemical and physical changes during ripening and cooking to proceed much more rapidly and will thus result in a more tender product. Disruption of fibers in itself is desirable.

The introduction of substances into the meat which will hasten the chemical changes taking place within it during the hanging period is most desirable. Such substances may be fatty acids or enzymes. An increase in the enzymes within the meat, especially if the enzymes have the property of changing the connective tissue so as to render it less tough, will shorten the processing, as the velocity of the enzyme action depends not only on the type, but on the amount present, and its availability for reaction in the fibrous elements. By placing finely divided enzyme particles diffusely in or adjacent to the substances to be acted on, the processing will be speeded up and may in cases where the original meat is low in enzymes, produce a much more desirable product. Other substances such as acids may produce a similar effect. Still other substances which may be used are mineral or inorganic substances of desirable character, such as calcium phosphate compounds, and iron-containing substances. Other suitable substances, such as vitamins, either crystalline or non-crystalline, may be used, partly for their physical effect, partly because they are otherwise harmless or desirable.

The disruption, even minutely, of the relatively thin confining sheaths of the muscle fibers is a further aid in causing the meat to become more tender. The fibrous material or collagen in the presence of acids swells and loses toughness. Then, when cooked, it is more susceptible to further desirable changes. Thus if my process results in the release from their confining sheaths of muscle juices containing naturally formed acids and enzymes, the tenderizing of the product is aided by their action on the fibrous elements, which would otherwise be reached only by osmotic effect.

In meats from older and less well fed animals, the moisture content, which must also be optimum for the best tenderizing, may be increased so as to provide a better product.

According to my invention, these substances are introduced into the meat by subjecting it to finely divided particles of the substance traveling at very high speeds, the particles penetrating in considerable quantity deeply into the substance. These particles may be so small that the point of entry into the substance is not grossly visible. There is a tendency of these particles to be deposited throughout the substance but more of them are deposited at the points of greater resistance. As these points of greater resistance include the fibrous or connective tissue elements of the meat, the action of selective deposition in that instance is favorable for the entire process of rendering the meat more tender.

According to the present invention, therefore, meat is treated during the processing state by subjecting the meat to a spray or stream of particles such as fatty substances, enzymes, fatty acids or any other desired substances such as those referred to above, the particles moving at great enough velocity to penetrate the meat to a sufficient depth to produce a product more tender throughout the desired portions. Thus, liquified substances may be projected from a nozzle having pin-point openings (.0001 inch in diameter, for instance) at pressures sufficiently high to secure the desired penetration. For instance, pressure of about 1,000 to 7,000 lbs. per sq. in. may be used, if desired. Particles of solid substances may be sprayed in the form of a suitable suspension, or they may even be projected in any suitable manner at very high velocity in solid powder form, or in emulsion or dissolved form. The term "edible matter," as used in the claims, is intended to include any substance which is not deleterious to edibility of the meat.

What I claim as new and desire to secure by Letters Patent of the United States is:

1. The method of promoting tendering in meat which comprises the step of mechanically disrupting the fibrous tissue throughout desired portions of the meat by projecting at the surface of the meat and deeply into the interior thereof, a high velocity spray of particles of edible matter.

2. The method of promoting tendering in meat which comprises the step of mechanically disrupting the fibrous tissue throughout desired portions of the meat by projecting at the surface of the meat and deeply into the interior thereof, a high velocity spray of particles of a softening agent.

3. The step in the process of tenderizing meat which consists in effecting a minute mechanical disruption of the structure of the meat without substantially altering its gross appearance, by spraying the surface of the meat with particles of edible matter traveling at a velocity sufficiently high to deeply penetrate the flesh and effect such mechanical disruption.

4. The method of promoting tendering in meat which comprises the step of mechanically disrupting the fibrous tissue throughout desired portions of the meat by projecting at the surface of the meat and deeply into the interior thereof, a high velocity spray of particles of a fat.

5. The method of promoting tendering in meat which comprises the step of mechanically disrupting the fibrous tissue throughout desired portions of the meat by projecting at the surface of the meat and deeply into the interior thereof, a high velocity spray of particles of moisture.

6. The method of promoting tendering in meat which comprises the step of mechanically disrupting the fibrous tissue throughout desired portions of the meat by projecting at the surface of the meat and deeply into the interior thereof, a high velocity spray of particles of an enzyme.

7. The method of promoting tendering in meat which comprises directing at the surface of the meat a spray of edible matter having a high velocity sufficient to penetrate deeply into the interior of the meat and mechanically disrupt fibrous tissue therein.

8. The method of promoting tendering in meat which comprises directing at the surface of the meat a spray of edible matter at a sufficient pressure, of the order of thousands of pounds per square inch, to penetrate deeply into the interior of the meat and mechanically disrupt fibrous tissue therein.

VLADIMIR LESLIE TICHY.

REFERENCES CITED

The following references are of record in the file of this patent:

UNITED STATES PATENTS

| Number | Name | Date |
| --- | --- | --- |
| 2,221,689 | Jensen | Nov. 12, 1940 |
| 2,240,518 | Ramsbottom | May 6, 1941 |

FOREIGN PATENTS

| Number | Country | Date |
| --- | --- | --- |
| 351,355 | British | 1931 |
| 515,481 | British | 1939 |